US011043659B2

(12) United States Patent
Hiratsuka

(10) Patent No.: US 11,043,659 B2
(45) Date of Patent: Jun. 22, 2021

(54) POSITIVE ELECTRODE FOR NONAQUEOUS ELECTROLYTE SECONDARY BATTERY AND NONAQUEOUS ELECTROLYTE SECONDARY BATTERY

(71) Applicant: Panasonic Corporation, Kadoma (JP)

(72) Inventor: Hidekazu Hiratsuka, Osaka (JP)

(73) Assignee: PANASONIC CORPORATION, Kadoma (JP)

( * ) Notice: Subject to any disclaimer, the term of this patent is extended or adjusted under 35 U.S.C. 154(b) by 89 days.

(21) Appl. No.: 16/335,088

(22) PCT Filed: May 19, 2017

(86) PCT No.: PCT/JP2017/018768
§ 371 (c)(1),
(2) Date: Mar. 20, 2019

(87) PCT Pub. No.: WO2018/061298
PCT Pub. Date: Apr. 5, 2018

(65) Prior Publication Data
US 2019/0221828 A1      Jul. 18, 2019

(30) Foreign Application Priority Data

Sep. 29, 2016   (JP) .............................. JP2016-192034

(51) Int. Cl.
*H01M 4/02*      (2006.01)
*H01M 4/13*      (2010.01)
(Continued)

(52) U.S. Cl.
CPC ............. *H01M 4/13* (2013.01); *H01M 4/131* (2013.01); *H01M 10/052* (2013.01); *H01M 2004/021* (2013.01); *H01M 2004/028* (2013.01)

(58) Field of Classification Search
CPC ..................................................... H01M 4/02
See application file for complete search history.

(56) References Cited

U.S. PATENT DOCUMENTS

2009/0169997 A1    7/2009   Saruwatari et al.
2011/0003200 A1*   1/2011   Shizuka ............ H01M 10/0525
                                                                    429/206
(Continued)

FOREIGN PATENT DOCUMENTS

CN    103155238 A       6/2013
EP    3 142 173 A1      3/2017
(Continued)

OTHER PUBLICATIONS

International Search Report dated Jul. 25, 2017, issued in counterpart International Application No. PCT/JP2017/018768 (2 pages).
(Continued)

*Primary Examiner* — Jacob B Marks
(74) *Attorney, Agent, or Firm* — Westerman, Hattori, Daniels & Adrian, LLP

(57) ABSTRACT

A positive electrode for a nonaqueous electrolyte secondary battery includes a positive electrode current collector and a positive electrode mixture layer which contains a positive electrode active material and is disposed on the positive electrode current collector. The void ratio of the positive electrode mixture layer is 30% or less, and the void ratio of secondary particles of the positive electrode active material is within a range of 30% or more and 70% or less of the void ratio of the positive electrode mixture layer.

3 Claims, 4 Drawing Sheets

(51) Int. Cl.
*H01M 4/131* (2010.01)
*H01M 10/052* (2010.01)

(56) References Cited

U.S. PATENT DOCUMENTS

| | | |
|---|---|---|
| 2013/0078531 A1 | 3/2013 | Saruwatari et al. |
| 2013/0209888 A1* | 8/2013 | Nagai ................. H01M 4/1391 429/231.1 |
| 2015/0207134 A1 | 7/2015 | Mizuno et al. |

FOREIGN PATENT DOCUMENTS

| | | |
|---|---|---|
| JP | 2001-85006 A | 3/2001 |
| JP | 2003-308829 A | 10/2003 |
| JP | 2009-158396 A | 7/2009 |
| JP | 2012-138322 A | 7/2012 |
| JP | 2014-82116 A | 5/2014 |
| JP | 2014-143063 A | 8/2014 |
| WO | 2012/049779 A1 | 4/2012 |
| WO | 2015/170561 A1 | 11/2015 |

OTHER PUBLICATIONS

English Translation of Search Report dated Jan. 5, 2021, issued in counterpart CN Application No. 201780036751.0. (2 pages).

* cited by examiner

POSITIVE ELECTRODE FOR NONAQUEOUS ELECTROLYTE SECONDARY BATTERY AND NONAQUEOUS ELECTROLYTE SECONDARY BATTERY

TECHNICAL FIELD

The present invention relates to a positive electrode for a nonaqueous electrolyte secondary battery and a nonaqueous electrolyte secondary battery.

BACKGROUND ART

Patent Literature 1 discloses a lithium-nickel composite oxide (positive electrode active material) containing secondary particles which have an average particle diameter of 5 µm to 30 µm and are formed by aggregation of primary particles having an average particle diameter of 1 µm to 8 µm, the secondary particles having a void ratio of 30% or less.

CITATION LIST

Patent Literature

PTL 1: Japanese Published Unexamined Patent Application No. 2001-85006

SUMMARY OF INVENTION

Patent Literature 1 increases the packing density of the positive electrode active material by adjusting the void ratio of the secondary particles of the positive electrode active material to 30% or less, and is thus capable of attempting to increase the capacity of a nonaqueous electrolyte secondary battery. On the other hand, electrolyte permeability is decreased, and thus it is difficult to attempt to increase the output.

The present disclosure has been achieved in consideration of the problem of the related art described above, and an object thereof is to provide a positive electrode for a nonaqueous electrolyte secondary battery, which is capable of increasing the capacity and output of a nonaqueous electrolyte secondary battery.

In an aspect of the present disclosure, a positive electrode for a nonaqueous electrolyte secondary battery includes a positive electrode current collector and a positive electrode mixture layer which contains a positive electrode active material and is disposed on the positive electrode current collector. The void ratio of the positive electrode mixture layer is 30% or less, and the void ratio of secondary particles of the positive electrode active material is within a range of 30% or more and 70% or less of the void ratio of the positive electrode mixture layer.

In an aspect of the present disclosure, a nonaqueous electrolyte secondary battery includes the positive electrode for a nonaqueous electrolyte secondary battery, a negative electrode, and a nonaqueous electrolyte.

According to an aspect of the present disclosure, an attempt can be made to increase the capacity and output of a nonaqueous electrolyte secondary battery.

DESCRIPTION OF EMBODIMENTS

As a result of earnest investigation by the present inventors, it was found that an attempt to increase both the capacity and output of a nonaqueous electrolyte secondary battery can be made by optimizing the void ratio of a positive electrode mixture layer constituting a positive electrode for a nonaqueous electrolyte secondary battery and by optimizing the void ratio of secondary particles of a positive electrode active material, which occupies the void ratio of the positive electrode mixture layer. In a positive electrode for a nonaqueous electrolyte secondary battery according to an embodiment of the present disclosure, the void ratio of a positive electrode mixture layer is 30% or less, and the void ratio of secondary particles of a positive electrode active material is within a range of 30% or more and 70% or less of the void ratio of the positive electrode mixture layer. Therefore, an attempt can be made to increase both the capacity and output of a nonaqueous electrolyte secondary battery. Although the mechanism of this phenomenon is not clear enough, it is considered that the packing density of the positive electrode active material can be kept high by adjusting the void ratio of the positive electrode mixture layer to 30% or less. This alone causes unsatisfactory electrolyte permeability into the second particles of the positive electrode active material. However, when the void ratio of the secondary particles of the positive electrode active material is within a range of 30% or more and 70% or less of the void ratio of the positive electrode mixture layer, many routes can be secured for electrolyte permeation into the secondary particles from voids between the secondary particles of the positive electrode active material. Thus, electrolyte permeation into the secondary particles is considered to be improved. Therefore, it is considered that both the higher capacity and higher output of a nonaqueous electrolyte secondary batter can be achieved.

Embodiments are described in detail below with reference to the drawings. A positive electrode for a nonaqueous electrolyte secondary battery and a nonaqueous electrolyte secondary battery of the present disclosure are not limited to the embodiments described below. The drawings referred to in the description of the embodiments are schematic.

In the embodiments described below, described as an example is a prismatic battery including a laminated structure electrode body which is formed by alternately laminating a plurality of positive electrodes and a plurality of negative electrodes through separators and which is housed in a prismatic outer case. However, the structure of the electrode body is not limited to the laminated structure and may be a wound structure. The battery case is not limited to the prismatic metal case (outer case) and may be a coin-shaped or cylindrical metal case, or a resin case made of a resin film.

Figure 1:
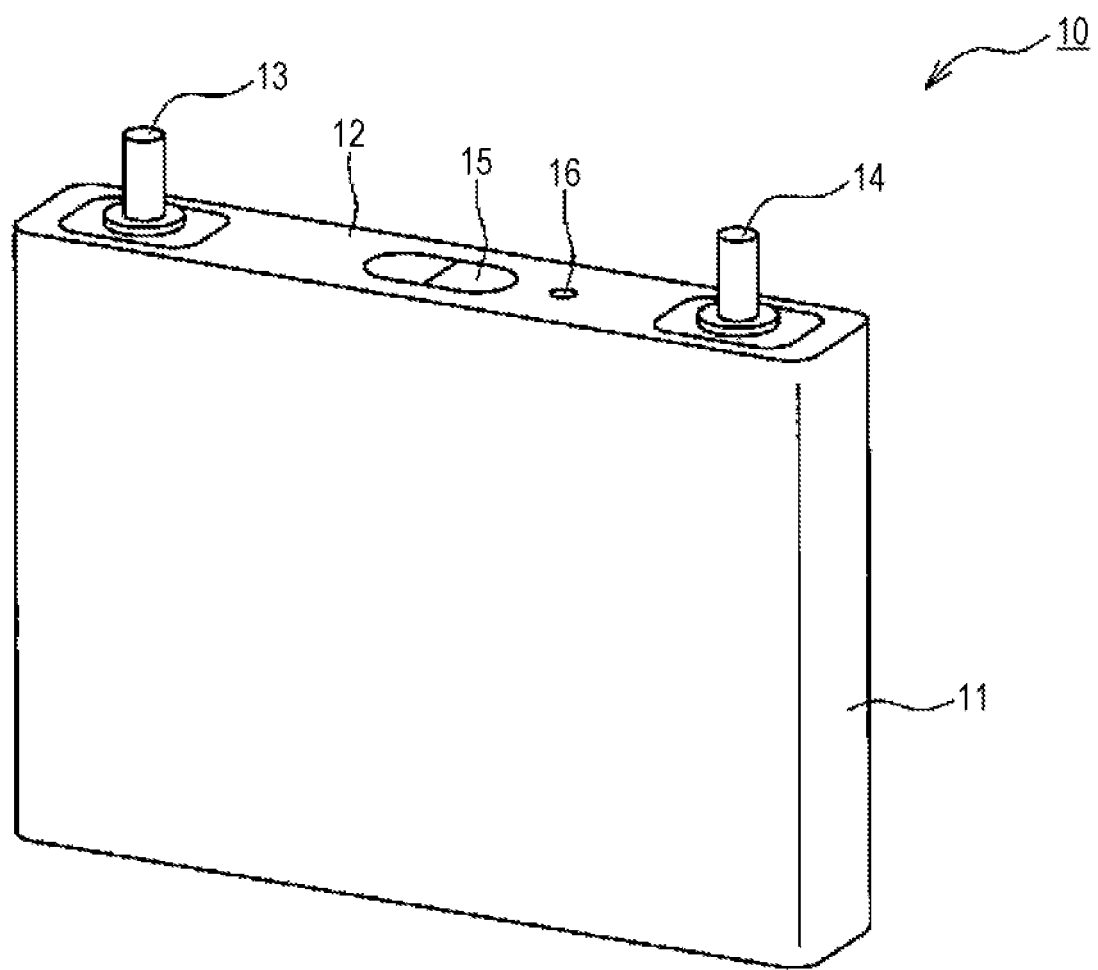
FIG. 1 is a perspective view of a nonaqueous electrolyte secondary battery according to an embodiment.

FIG. 1 is a perspective view showing the appearance of a nonaqueous electrolyte secondary battery according to an embodiment. As illustrated in FIG. 1, a nonaqueous electrolyte secondary battery 10 includes an outer case 11 which houses an electrode body and a nonaqueous electrolyte, and a sealing plate 12 which closes an opening of the outer case 11. The outer case 11 is, for example, a bottomed cylindrical metal container. The electrode body includes a plurality of positive electrodes, a plurality of negative electrodes, and at least one separator, has a structure in which the positive electrodes and the negative electrodes are alternately laminated through the separator, and is housed in the outer case 11.

The sealing plate 12 is provided with a positive electrode outer terminal 13, a negative electrode outer terminal 14, a gas release valve 15, and a liquid injection part 16. The positive electrode outer terminal 13 and the negative electrode outer terminal 14 attached to the sealing plate 12 in the state of being electrically insulated from the sealing plate 12 by using, for example, an insulating gasket. The positive electrode outer terminal 13 is connected to the positive electrodes in the outer case 11, and the negative electrode outer terminal 14 is connected to the negative electrodes in the outer case 11. In addition, another form may be used, in which only the negative electrode outer terminal is provided as an outer terminal on the sealing plate 12, and the outer case 11 is used as the positive electrode outer terminal. The liquid injection part 16 generally includes an injection hole for injecting the electrolyte and a sealing plug which closes the injection hole.

Each of the components of the nonaqueous electrolyte secondary battery 10 is described in detail below.

[Positive Electrode]

Each of the positive electrodes includes a positive electrode current collector such as, for example, a metal foil or the like, and a positive electrode mixture layer formed on the positive electrode current collector. A foil of a metal such as aluminum or the like, which is stable within the potential range of the positive electrode, a film having the metal disposed in a surface layer, or the like can be used as the positive electrode current collector.

The positive electrode mixture layer contains a positive electrode active material. The positive electrode mixture layer preferably also contains a conductive material and a binder other than the positive electrode active material.

The positive electrode can be produced by, for example, preparing a positive electrode mixture slurry containing secondary particles of the positive electrode active material, the conductive material, and the binder, applying and drying the positive electrode mixture slurry on the positive electrode current collector to form the positive electrode mixture layer, and then pressure-molding the positive electrode mixture layer.

Figure 2A:
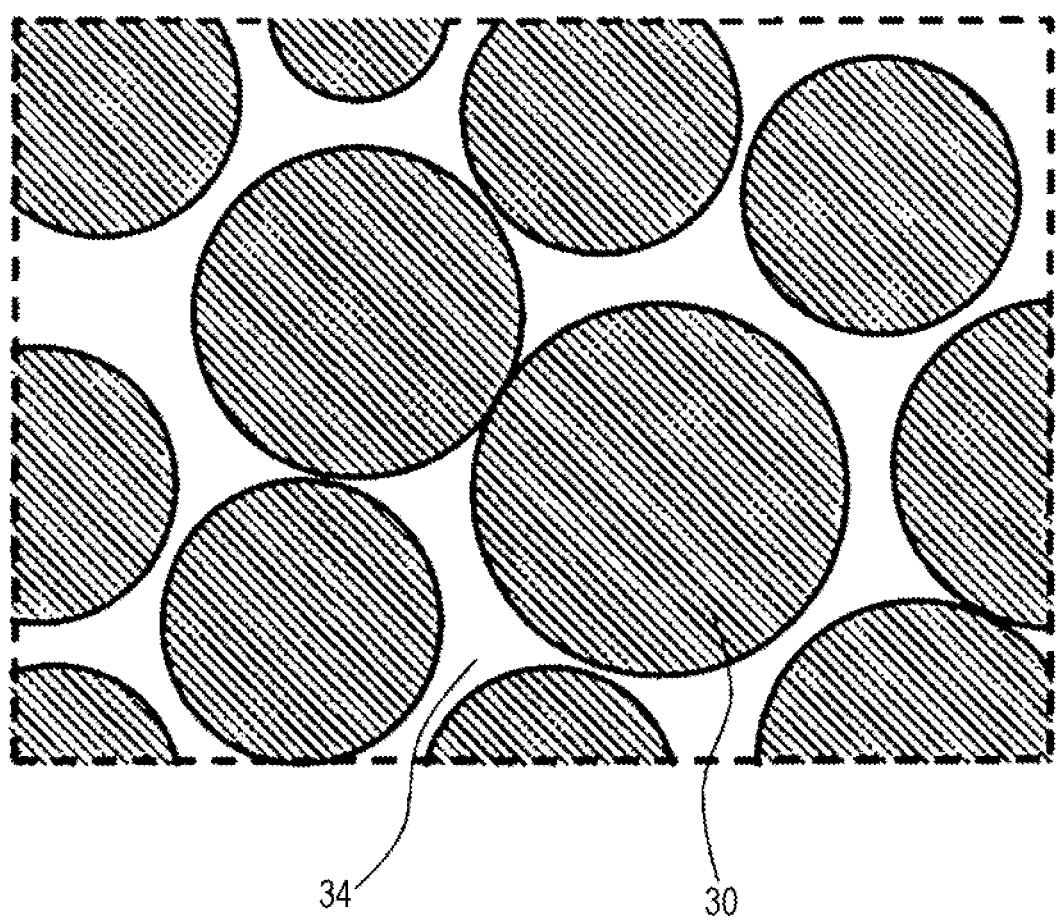
FIG. 2A is an enlarged schematic view showing a portion of a section of a positive electrode mixture layer.
Figure 2B:
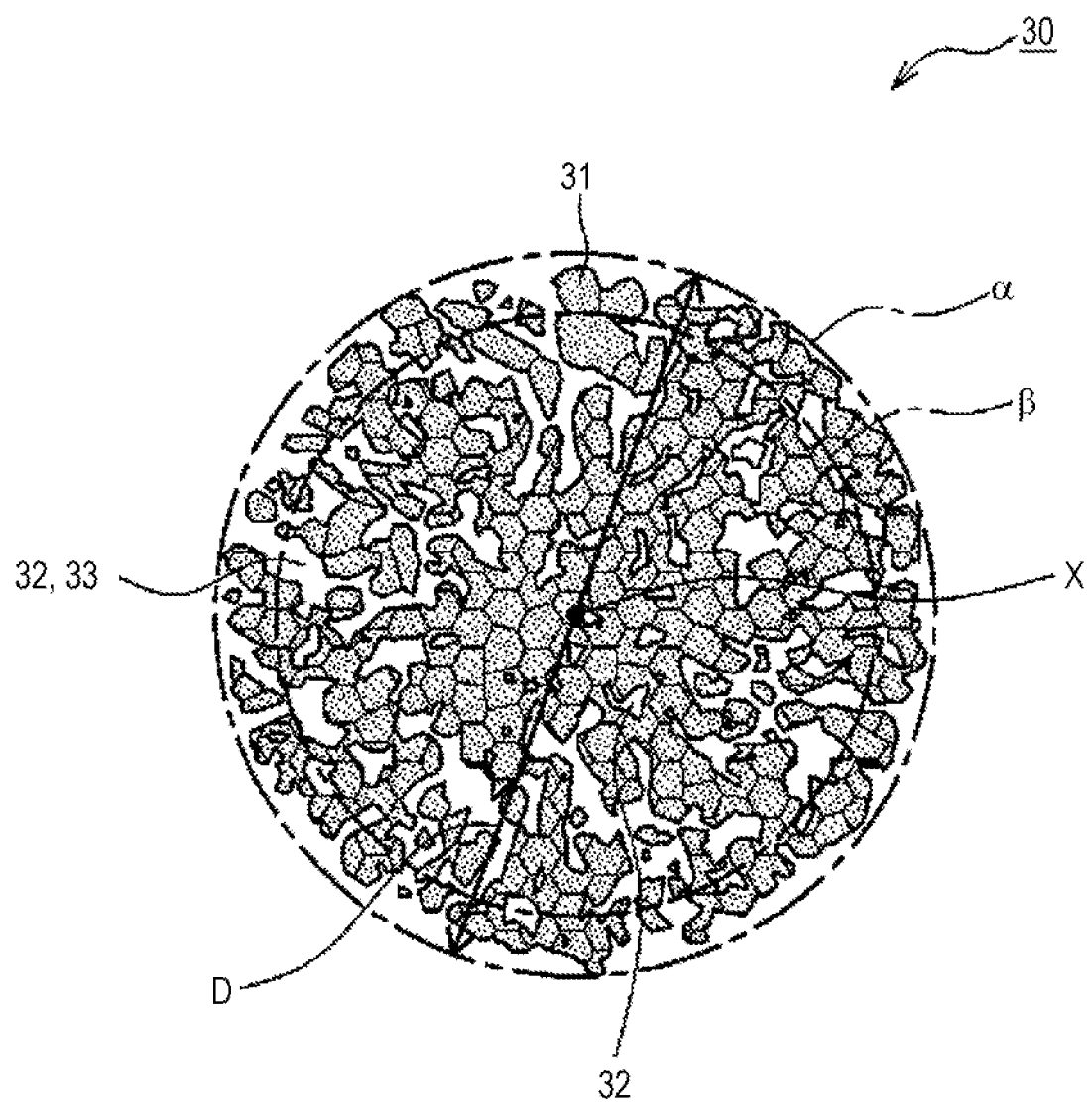
FIG. 2B is an enlarged schematic view showing a section of a secondary particle of a positive electrode active material in the section of the positive electrode mixture layer shown in FIG. 2A.

FIG. 2A is an enlarged schematic view showing a portion of a section of the positive electrode mixture layer. FIG. 2B is an enlarged schematic view showing a section of a secondary particle of the positive electrode active material in the section of the positive electrode mixture layer shown in FIG. 2A. As shown in FIG. 2A, the positive electrode mixture layer has voids 34 (hereinafter, voids 34 between the secondary parties) formed between secondary particles 30 of the positive electrode active material. As shown in FIG. 2B, each of the secondary particles 30 is formed by aggregation of primary particles 31 and has voids 32 (hereinafter, the voids 32 in the secondary particles) formed between the primary particles 31.

In the specification of the present disclosure, the term "void ratio of the positive electrode mixture layer" represents the two-dimensional value determined from the ratio of the area of voids in the positive electrode mixture layer to the sectional area of the positive electrode mixture layer. The voids of the positive electrode mixture layer include the voids 34 between the secondary particles and the voids 32 in the secondary particles. In addition, the term "void ratio of the secondary particles of the positive electrode active material" represents the two-dimensional value determined from the ratio of area of the voids 32 in the secondary particles to the sectional area of the secondary particles 30 of the positive electrode active material in a section of the positive electrode mixture layer.

The void ratio of the positive electrode mixture layer and the void ratio of the secondary particles of the positive electrode active material can be determined by analyzing a SEM image obtained by observation with a scanning electron microscope (SEM). For example, a positive electrode for a nonaqueous electrolyte secondary battery is buried in a resin, and a SEM image is photographed in a state where a section can be observed by cross-section polisher (CP) processing. Then, void portions (the voids 34 between the secondary particles and the voids 32 in the secondary particles) are detected as black portions by using an analysis software such as Image-Pro PLUS or the like, and the area thereof is determined. The area of the black portions is regarded as the area of voids of the positive electrode mixture layer, and the void ratio of the positive electrode mixture layer can be determined by calculating the ratio of the area of voids of the positive electrode mixture layer to the area of the SEM image. In the SEM image, an outer diameter line is drawn along the surface of each of the secondary particles 30 of the positive electrode active material, and the total area of portions surrounded by the outer diameter lines is determined. This total area is considered as the sectional area of the secondary particles of the positive electrode active material. In addition, the total area of black portions in the portions surrounded by the outer diameter lines is determined, and this total area is regarded as the area of the voids 32 in the secondary particles. The void ratio of the secondary particles of the positive electrode active material can be determined by calculating the ratio of area of the voids 32 in the secondary particles to the sectional area of the secondary particles.

The void ratio of the positive electrode mixture layer is not particularly limited as long as it is 30% or less, but in view of the electrolyte permeation into the positive electrode mixture layer or the like, it is, for example, preferably within a range of 10% or more and 30% or less and more preferably within a range of 15% or more and 30% or less. When the void ratio of the positive electrode mixture layer exceeds 30%, the packing density of the positive electrode active material is decreased, and thus it is difficult to attempt to increase the capacity of the nonaqueous electrolyte secondary battery.

The void ratio of the positive electrode mixture layer can be adjusted by, for example, changing the pressure during pressure-molding of the positive electrode mixture layer. The pressure during pressure-molding is, for example, preferably within a range of 100 MPa or more and 1000 MPa or less, depending on the thickness or the like of the positive electrode mixture layer.

The void ratio of the secondary particles of the positive electrode active material is not particularly limited as long as it is within a range of 30% or more and 70% or less of the void ratio of the positive electrode mixture layer. This is replaced with the description that the void ratio of the secondary particles of the positive electrode active material accounts for a range of 30% or more and 70% or less of the void ratio of the positive electrode mixture layer. In view of the electrolyte permeation into the secondary particles of the positive electrode active material, the void ratio of the secondary particles of the positive electrode active material is, for example, preferably within a range of 35% or more and 65% or less of the void ratio of the positive electrode mixture layer and more preferably within a range of 40% or more and 60% or less of the void ratio of the positive electrode mixture layer.

When the void ratio of the secondary particles of the positive electrode active material is less than 30% of the void ratio of the positive electrode mixture layer, gaps between the primary particles are decreased, and thus the electrolyte hardly permeates into the secondary particles. While when the void ratio of the secondary particles of the positive electrode active material exceeds 70% of the void ratio of the positive electrode mixture layer, gaps between the secondary particles are decreased, and thus the routes of electrolyte permeation into the secondary particles are considered to be narrowed or decreased. In any one of the cases, it is difficult to attempt to increase the output of the nonaqueous electrolyte secondary battery.

Examples of a method for adjusting the void ratio of the secondary particles of the positive electrode active material include a method of changing the firing temperature for synthesis of the positive electrode active material, a method of adjusting the tap density of a transition metal oxide used as a raw material, a method of adjusting the concentrations of a Li source and a transition metal oxide used as raw materials, a method of adding a sintering inhibitor (for example, tungsten, niobium, molybdenum, phosphorus, sulfur, or the like) during synthesis of the positive electrode active material, a method of producing a porous transition metal oxide by spray-drying a slurry containing a transition metal as a raw material in a gas phase, and the like.

The average particle diameter of the primary particles constituting the secondary particles of the positive electrode active material is, for example, preferably 2 μm or less and more preferably within a range of 0.5 μm or more and 2 μm or less. With the average particle diameter within the range, the void ratio of the secondary particles can be easily increased. The primary particles are, for example, ellipsoidal or rod-shaped particles or the like. The aspect ratio which is the ratio (long diameter/short diameter) of the long diameter to the short diameter of primary particles is preferably 2 or more. Alternatively, among the primary particles 31 constituting the secondary particles of the positive electrode active material preferably, for example, 50% or more of the primary particles preferably have an aspect ratio of 2 or more. The average particle diameter of the primary particles is calculated based on the long diameter. The short diameter of the primary particles is, for example, 0.2 μm to 1 μm.

The average particle diameter of the primary particles can be measured by using SEM. A specific measurement method is as follows.

(1) Ten particles are randomly selected from a particle image obtained by observing the particles of the positive electrode active material with SEM (×2000 times).

(2) The particle boundaries of the primary particles of the selected ten particles are observed, and each of the primary particles is determined.

(3) The long diameter (longest diameter) of each of the primary particles is determined, and the average value for the selected ten particles is regarded as the average particle diameter of the primary particles.

The average particle diameter of the secondary particles of the positive electrode active material is, for example, 5 μm to 30 μm and preferably 7 μm to 20 μm. The average particle diameter of the secondary particles of the positive electrode active material represents the median diameter (volume basis) measured by a laser diffraction method and can be measured by, for example, using a laser diffraction/scattering particle size distribution analyzer manufactured by Horiba Ltd.

As shown in FIG. 2B, the voids 32 in the secondary particles of the positive electrode active material preferably include long voids 33 communicating into the particle beyond a length corresponding to ⅙ of particle diameter D from the surface of each of the secondary particles 30. When the long voids 33 are formed, the electrolyte can be rapidly permeated into the secondary particles 30 of the positive electrode active material. As shown in FIG. 2B, the particle diameter D is the diameter of a circumcircle α of the secondary particle 30 in a section of the secondary particle 30. In the specification of the present disclosure, the voids having a length exceeding ⅙ of the particle diameter D from the circumcircle α (particle surface) to the center X of the circumcircle α are defined as the long voids 33. In other words, the voids not having openings (inlets) in the particle surface and the voids having a length equal to or smaller than the length corresponding to ⅙ of the particle diameter D are not the long voids 33.

The long voids 33 may extend roughly straightly from the particle surface to the center X or may meander. Also, the long voids 33 may be branched, and there may be a plurality of at least either the inlets or the ends in one continuous long void 33. The long voids 33 formed so as to meander may have a length exceeding the particle diameter D.

The inlets of the long voids 33 are preferably uniformly formed over the entire particle surface of each of the secondary particles 30 of the positive electrode active material. The long voids 33 may communicate into the particle beyond a length corresponding to 2/6 (⅓) or 3/6 (½) of the particle diameter D from the particle surface to the center X. FIG. 2B shows a circle β which is a concentric circle α with the circumcircle and which has a diameter of ⅚ of the particle diameter D. When the secondary particles 30 of the positive electrode active material have a substantially circular particle section, the long voids 33 formed from the surface of each of the particles preferably communicate into the particle beyond the circle β.

The ratio (may be referred to as the "long void ratio" hereinafter) of the long voids 33 to the voids 32 in the secondary particles is, for example, preferably 20% or more, more preferably 30% or more, or still more preferably 50% or more. The ratio of the long voids 33 to the voids 32 in the secondary particles is calculated by the formula: (area of the long voids 33/area of the voids 32)×100. The average value (N=100) of long void ratios of the secondary particles 30 having an average particle diameter of 7 μm to 15 μm is, for example, preferably within a range of 20% or more and 80% or less, more preferably within a range of 30% to 70%, and still more preferably within a range of 30% to 60%.

The conductive material contained in the positive electrode mixture layer may be partially present in the voids 32 in the secondary particles. For example, when the positive electrode mixture slurry is prepared or when the positive electrode mixture layer is formed, the conductive material partially enters the insides of the voids 32 having openings in the particle surfaces of the secondary particles 30. The conductive material may be partially present in the long voids 33 and enter the insides of the particles beyond a length corresponding to ⅙ of the particle diameter D. When the conductive material is present in the voids, for example, a good conductive path may be formed in the positive electrode mixture layer, thereby further improving output characteristics.

The pore size diameter distribution of the positive electrode mixture layer is preferably a distribution curve having a single peak. The pore size diameter distribution of the positive electrode mixture layer is a pore size diameter distribution in which pore size diameters (void diameters) of the positive electrode mixture layer measured by a mercury penetration method are shown in common logarithm. For example, the pore size diameter distribution can be shown by a graph in which the pore size diameter (common logarithm) is shown on the abscissa, and the log differential pore volume is shown on the ordinate. The pore size diameter distribution can be measured by a mercury porosimeter (for example, trade name: Porosimeter model 9810 manufactured by Shimadzu Corporation). When the pore size diameter distribution of the positive electrode mixture layer has a single peak, the diameter of the voids 34 between the secondary particles shown in FIG. 2A is the same level as the diameter of the voids 32 in the secondary particles shown in FIG. 2B, and electrolyte permeation into the secondary particles 30 can be improved. On the other hand, when the pore size diameter distribution of the positive electrode mixture layer has two or more peaks, a difference between the diameter of the voids 34 between the secondary particles and the diameter of the voids 32 in the secondary particles is increased, and thus output characteristics may be decreased as compared with the positive electrode mixture layer showing a distribution curve having a single peak.

According to the embodiment, the thickness of the positive electrode mixture layer can be adjusted to 100 µm or more. When the positive electrode mixture layers are formed on both surfaces of the current collector, the thickness of each of the positive electrode mixture layers can be adjusted to 100 µm or more. In general, when the thickness of the positive electrode mixture layer is 100 µm or more, the electrolyte may hardly enter the inside of the positive electrode mixture layer, and thus the output characteristics may be significantly degraded. However, when the void ratio of the positive electrode mixture layer and the void ratio of the secondary particles occupying the void ratio of the positive electrode mixture layer are within the respective ranges described above, the electrolyte easily penetrates into the positive electrode mixture layer and into the secondary particles, and significant deterioration in output characteristics can be suppressed.

The positive electrode active material is composed of a lithium transition metal oxide as a main component. The main component represents a material at the highest content among the materials constituting the positive electrode active material. The content of the lithium transition metal oxide in the positive electrode mixture layer is, for example, preferably 90% by mass or more, and may be substantially 100% by mass. A preferred example of the lithium transition metal oxide is an oxide containing at least nickel (Ni), cobalt (Co), and manganese (Mn) and having a Ni ratio of 30 mol % or more relative to the total number of moles of metal elements excluding lithium (Li). By using a composite oxide containing Ni, Co, and Mn, the void ratio of the secondary particles of the positive electrode active material can be easily adjusted, and an attempt to increase the capacity of the positive electrode can be made by increasing the Ni content.

An example of the lithium transition metal oxide is an oxide represented by the composition formula $Li_aNi_xM_{(1-x)}O_2$ ($0.95 \leq a \leq 1.2$, $0.3 \leq x \leq 1.0$, and M is a metal element other tan Li and Ni). The Ni content may be 0.5 mol % or more and may be 0.5 mol % to 0.8 mol %. The metal elements other than Li and Ni contained in the lithium transition metal oxide are preferably Co and Mn as described above. When the sintering inhibitor is added in forming the positive electrode active material, there is contained at least one selected from tungsten (W), niobium (Nb), molybdenum (Mo), phosphorus (P), sulfur (S). Further, there may be contained at least one selected from magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), lead (Pb), and bismuth (Bi).

The positive electrode active material is produced by, for example, firing a mixture of a transition metal compound such as nickel-cobalt-manganese hydroxide or the like synthesized by a coprecipitation method, a lithium compound serving as a lithium raw material, and the sintering inhibitor.

Firing is performed at, for example, a temperature of 900° C. to 1000° C. in an oxygen stream. A material having a tap density (compacted density) of 1.8 g/cc or less measured by, for example, a powder tester (PT-X manufactured by Hosokawa Micron Corporation) is preferably used as the transition metal compound, and a material having a tap density of 1 g/cc or more and 1.8 g/cc or less is more preferably used. Examples of the lithium compound include lithium hydroxide (LiOH), lithium carbonate ($Li_2CO_3$), and the like. Usable examples of the sintering inhibitor include oxides containing tungsten, niobium, molybdenum, or the like, phosphate salts such as lithium phosphate and the like, and the like. The Li raw material is preferably added so that the molar ratio L of Li to the metals excluding Li in the synthesis raw materials of the positive electrode active material is within the range of $1.00<L<1.18$. These synthesis conditions for the positive electrode active material are within a preferred range for adjusting the void ratio of the secondary particles of the positive electrode active material within the intended range. However, these conditions are an example, and the synthesis conditions are not limited to these.

Examples of the conductive material include carbon materials such as carbon black, acetylene black, ketjen black, graphite, and the like. These may be used alone or in combination of two or more.

Examples of the binder include fluorocarbon resins such as polytetrafluoroethylene (PTFE), polyvinylidene fluoride (PVdF), and the like; polyacrylonitrile (PAN), polyimide, acryl resins, polyolefin, and the like. Any one of these resins may be used in combination with carboxymethyl cellulose (CMC) or a salt thereof, polyethylene oxide (PEO), or the like. These may be used alone or in combination or two or more.

[Negative Electrode]

Each of the negative electrodes includes a negative electrode current collector composed of, for example, a metal foil or the like, and a negative electrode mixture layer formed on the current collector. A foil of a metal such as copper or the like, which is stable within the potential range of the negative electrode, a film having the metal disposed in a surface layer, or the like can be used as the negative electrode current collector. The negative electrode mixture layer contains a negative electrode active material and a binder. The negative electrode can be produced by, for example, preparing a negative electrode mixture slurry containing the negative electrode active material, the binder, etc., applying and drying the negative electrode mixture slurry on the negative electrode current collector to form the negative electrode mixture layer, and then pressure-molding the negative electrode mixture layer.

The negative electrode active material is not particularly limited as long as it can reversibly absorb and release lithium ions, and usable examples thereof include carbon materials such as natural graphite, synthetic graphite, and the like; metals which alloy with lithium, such as silicon (Si), tin (Sn), and the like; alloys and composite oxides containing a metal element such as Si, Sn, or the like. These negative electrode active materials may be used alone or in combination of two or more.

Like the positive electrode, usable examples of the binder include fluorocarbon resins, PAN, polyimide, acryl resins, polyolefin, and the like. When the mixture slurry is prepared by using an aqueous solvent, preferably used is CMC or a salt thereof, styrene-butadiene rubber (SBR), polyacrylic acid (PAA) or a salt thereof, polyvinyl alcohol (PVA), or the like.

[Separator]

A porous sheet having ion permeability and insulation can be used as the separator. Examples of the porous sheet include a microporous thin film, a woven fabric, a nonwoven fabric, and the like. The separator is composed of, for example, polyolefin such as polyethylene, polypropylene, or the like, cellulose, or the like. The separator may be a laminate having a cellulose fiber layer and a thermoplastic resin fiber layer of polyolefin or the like. Further, the separator may be a multilayer separator including a polyethylene layer and a polypropylene layer and may have a surface layer composed of an aramid resin or a surface layer containing an inorganic filler.

[Nonaqueous Electrolyte]

The nonaqueous electrolyte contains a nonaqueous solvent and a solute (electrolyte salt) dissolved in the nonaqueous solvent. Usable examples of the nonaqueous solvent, include esters, ethers, nitriles, amides such as dimethyl formamide and the like, isocyanates such as hexamethylene diisocyanate and the like, a mixed solvent of two or more of these solvents, and the like. The nonaqueous solvent may contain a halogen-substituted compound produced by at least partially substituting the hydrogen atoms of the solvent with halogen atoms such as fluorine or the like.

Examples of the esters include cyclic carbonate esters such as ethylene carbonate (EC), propylene carbonate (PC), butylene carbonate, and the like; linear carbonate esters such as dimethyl carbonate (DMC), methyl ethyl carbonate (EMC), diethyl carbonate (DEC), methyl propyl carbonate, ethyl propyl carbonate, methyl isopropyl carbonate, and the like; cyclic carboxylate esters such as γ-butyrolactone, γ-valerolactone, and the like; linear carboxylate esters such as methyl acetate, ethyl acetate, propyl acetate, methyl propionate (MP), ethyl propionate, and the like; and the like.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, crown ethers, and the like; linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and the like; and the like.

Examples of the nitriles include acetonitrile, propionitrile, butyronitrile, valeronitrile, n-heptanitrile, succinonitrile, glutaronitrile, adiponitrile, pimelonitrile, 1,2,3-propanetricarbonitrile, 1,3,5-pentanetricarbonitrile, and the like.

Examples of the halogen-substituted compound include fluorinated cyclic carbonate esters such as fluoroethylene carbonate (FEC) and the like, fluorinated liner carbonate esters, fluorinated liner carboxylate esters such as methyl fluoropropionate (FMP) and the like, and the like.

Examples of the electrolyte salts include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lithium lower aliphatic carboxylates, $Li_2B_4O_7$, boric acid salts such as $Li(B(C_2O_4)F_2)$ and the like, $LiN(SO_2CF_3)_2$, imide salts such as $LiN(C_lF_{2l+1}SO_2)(C_mF_{2m+1}SO_2)$ {l and m are each an integer of 1 or more} and the like, and the like. These electrolyte salts may be used alone or in a mixture of a plurality of types. The concentration of the electrolyte salt is, for example, 0.8 to 1.8 moles per L of the nonaqueous solvent.

EXAMPLES

The present disclosure is further described below by giving examples, but the present disclosure is not limited to these examples.

Example 1

[Formation of Positive Electrode Active Material]

A transition metal hydroxide having a tap density of 1.5 g/cc and represented by the composition formula $Ni_{0.33}Co_{0.33}Mn_{0.33}(OH)_2$, LiOH, and a sintering inhibitor were mixed, and the resultant mixture was fired in an oxygen stream at 935° C. for 50 hours to synthesize a lithium transition metal oxide. Tungsten oxide ($WO_3$) was used as the sintering inhibitor, and the adding amount was 0.3 mol %. The resultant oxide was classified to produce a positive electrode active material having an average particle diameter of 10 μm. The average particle diameter (median diameter on a volume basis) was measured by using a laser diffraction/scattering particle size distribution analyzer ("LA950" manufactured by Horiba Ltd.).

As a result of analysis of the positive electrode active material by a powder X-ray diffraction method using a powder X-ray diffractometer ("D8 ADVANCE" manufactured by Bruker AXS Inc., line source Cu-Kα), the positive electrode active material was assigned to a layered rock salt-type crystal structure. Also, as a result of analysis of the composition of the positive electrode active material by using an ICP optical emission spectrometer ("iCAP6300" manufactured by Thermo Fisher Scientific Inc.), the composition was $Li_{1.05}Ni_{0.33}CO_{0.33}Mn_{0.33}O_2$.

[Formation of Positive Electrode]

First, 95.8% by mass of the positive electrode active material, 3% by mass of carbon powder, and 1.2% by mass of polyvinylidene fluoride were mixed, and a proper amount of N-methyl-2-pyrrolidone (NMP) was further added to the resultant mixture to prepare a positive electrode mixture slurry. The slurry was applied to both surfaces of a current collector composed of an aluminum foil by a doctor blade method, and the coating films were dried and then rolled under a pressure of 500 MPa by using a rolling roller to form a positive electrode having positive electrode mixture layers formed on both surfaces of the positive electrode current collector. A position without the mixture layer formed was provided in a central portion in the longitudinal direction of the current collector, and a positive electrode tab was attached to the portion. The thickness of each of the positive electrode mixture layers was about 100 μm, and the total on both surfaces of the current collector was about 200 μm.

A SEM image of a section of the positive electrode formed as described above was photographed, and the void ratio was determined by using an analysis software of Image-Pro PLUS. As a result, the void ratio of the positive electrode mixture layers was 22%. In addition, the void ratio of secondary particles of the positive electrode active material was 55% of the void ratio of the positive electrode mixture layers.

Figure 3:
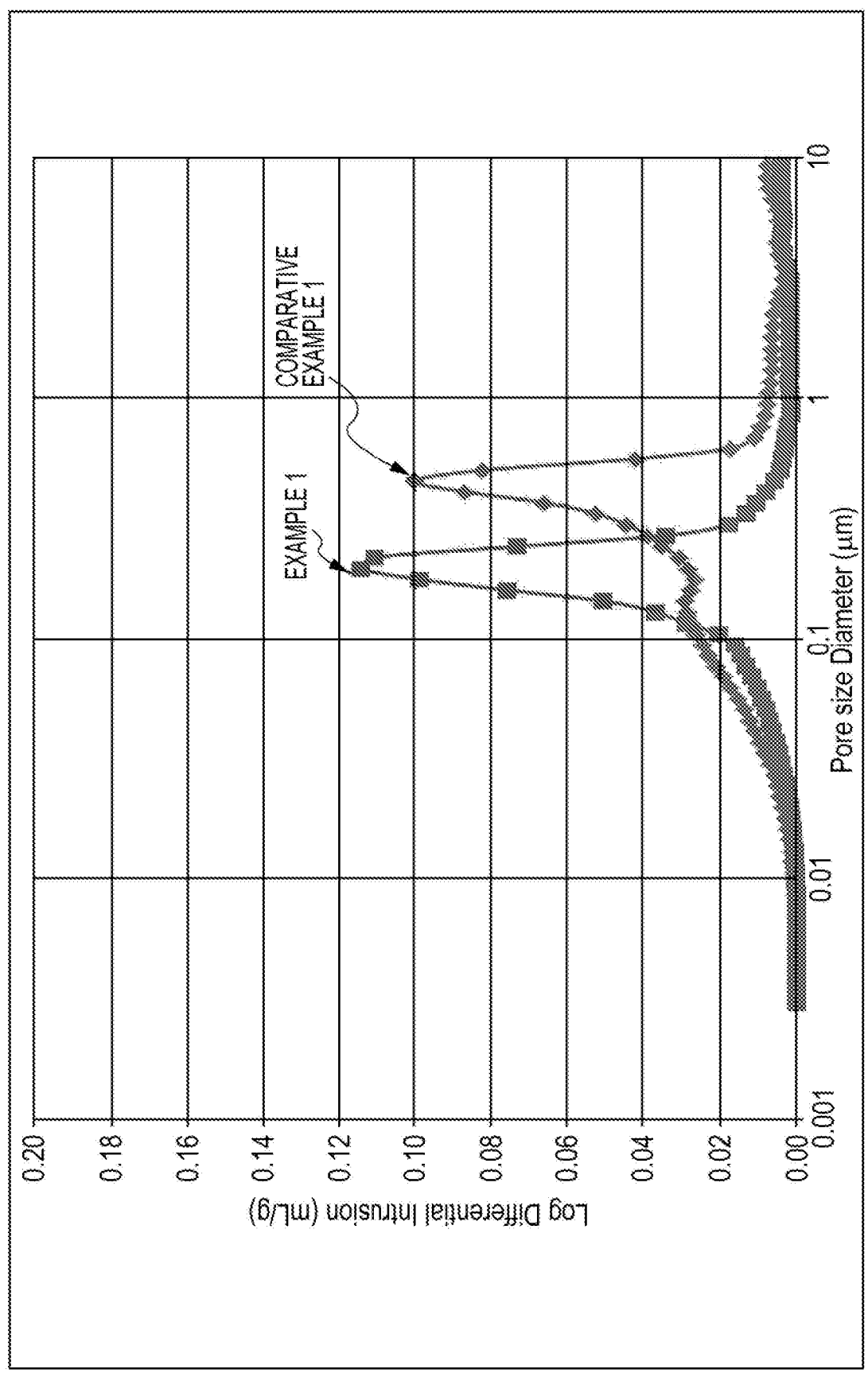
FIG. 3 is a diagram showing pore size diameter distributions of positive electrode mixture layers of Example 1 and Comparative Example 1.

Also, the pore size diameter distribution of the positive electrode mixture layers of the positive electrode formed as described above was measured by using a mercury porosimeter (trade name: Porosimeter model 9810 manufactured by Shimadzu Corporation). The results are shown in FIG. 3. FIG. 3 indicates that the pore size diameter distribution of the positive electrode mixture layers of Example 1 is a distribution curve having a single peak.

[Formation of Negative Electrode]

First, 98.2% by mass of graphite, 0.7% by mass of styrene-butadiene rubber, and 1.1% by mass of carboxymethyl cellulose sodium were mixed, and the resultant mixture was mixed with water to prepare a slurry. The slurry was applied to both surfaces of a current collector composed of a copper foil by a doctor blade method, and the coating films were dried and then rolled by using a rolling roller to form a negative electrode having negative electrode mixture layers formed on both surfaces of the negative electrode current collector. A portion without the mixture layer formed was provided at each of both ends in the longitudinal direction of the current collector, and a negative electrode tab was attached to the portions. The thickness of each of the negative electrode mixture layers was about 100 μm, and the total on both surfaces of the current collector was about 200 μm.

[Preparation of Nonaqueous Electrolyte]

A nonaqueous electrolyte was prepared by dissolving $LiPF_6$ at a concentration of 1.6 mol/L in an equivoluminal mixed solvent of ethylene carbonate (EC) and diethyl carbonate (DEC).

[Formation of Nonaqueous Electrolyte Secondary Battery]

A battery A1 was formed by using the positive electrode, the negative electrode, the nonaqueous electrolyte, and a separator according to the following procedures.

(1) The positive electrode and the negative electrode were wound through the separator to form an electrode body with a wound structure.

(2) Insulating plates were disposed above and below the electrode body, and the wound electrode body was housed in a battery outer case with a cylindrical shape having a diameter of 18 mm and a height of 65 mm.

(3) The current collector tab of the negative electrode was welded to the inner surface of the bottom of the battery outer case, and the current collector tab of the positive electrode was welded to the bottom plate of a sealing body.

(4) The nonaqueous electrolyte was injected from an opening of the battery outer case, and then the battery outer case was sealed by the sealing body, thereby producing a battery A1.

Example 2

A positive electrode active material was produced by the same method as in Example 1 except that in synthesizing the positive electrode active material, the firing temperature was changed to 990° C. A positive electrode was formed by the same method as in Example 1 using the positive electrode active material, and the void ratio was measured. As a result, the void ratio of the positive electrode mixture layers was 19%. In addition, the void ratio of secondary particles of the positive electrode active material was 35% of the void ratio of the positive electrode mixture layers. The results of measurement of the pore size diameter distribution of the positive electrode mixture layers of the positive electrode showed a distribution curve having a single peak.

A battery was produced by the same method as in Example 1 using the positive electrode formed as described above. This battery was referred to as "battery A2" of Example 2.

Example 3

A positive electrode active material was produced by the same method as in Example 1 except that in synthesizing the positive electrode active material, the firing temperature was changed to 870° C. A positive electrode was formed by the same method as in Example 1 using the positive electrode active material, and the void ratio was measured. As a result, the void ratio of the positive electrode mixture layers was 28%. In addition, the void ratio of secondary particles of the positive electrode active material was 69% of the void ratio of the positive electrode mixture layers. The results of measurement of the pore size diameter distribution of the positive electrode mixture layers of the positive electrode showed a distribution curve having a single peak.

A battery was produced by the same method as in Example 1 using the positive electrode formed as described above. This battery was referred to as "battery A3" of Example 3.

Example 4

A positive electrode active material was produced by the same method as in Example 1 except that in synthesizing the positive electrode active material, the tap density of the transition metal hydroxide was changed to a tap density of 1.8 g/cc. A positive electrode was formed by the same method as in Example 1 using the positive electrode active material, and the void ratio was measured. As a result, the void ratio of the positive electrode mixture layers was 22%. In addition, the void ratio of secondary particles of the positive electrode active material was 31% of the void ratio of the positive electrode mixture layers. The results of measurement of the pore size diameter distribution of the positive electrode mixture layers of the positive electrode showed a distribution curve having two peaks.

A battery was produced by the same method as in Example 1 using the positive electrode formed as described above. This battery was referred to as "battery A4" of Example 4.

Comparative Example 1

A positive electrode active material was produced by the same method as in Example 1 except that in synthesizing the positive electrode active material, the tap density of the transition metal hydroxide was changed to a tap density of 2.5 g/cc. A positive electrode was formed by the same method as in Example 1 using the positive electrode active material, and the void ratio was measured. As a result, the void ratio of the positive electrode mixture layers was 22%. In addition, the void ratio of secondary particles of the positive electrode active material was 28% of the void ratio of the positive electrode mixture layers. The results of measurement of the pore size diameter distribution of the positive electrode mixture layers of the positive electrode formed described above are shown in FIG. 3. FIG. 3 indicates that the pore size diameter distribution of the positive electrode mixture layers of Comparative Example 1 is a distribution curve having two peaks.

A battery was produced by the same method as in Example 1 using the positive electrode formed as described above. This battery was referred to as "battery B1" of Comparative Example 1.

Comparative Example 2

A positive electrode was produced by the same method as in Example 1 except that in producing the positive electrode, the pressure of 500 MPa by the rolling roller was changed to 50 MPa, and void ratios were measured. As a result, the void ratio of the positive electrode mixture layers was 35%. In addition, the void ratio of secondary particles of the positive electrode active material was 50% of the void ratio of the positive electrode mixture layers. The results of measurement of the pore size diameter distribution of the positive electrode mixture layers of the positive electrode formed described above show a distribution curve having two peaks.

A battery was produced by the same method as in Example 1 using the positive electrode formed as described above. This battery was referred to as "battery B2" of Comparative Example 2.

Comparative Example 3

A positive electrode active material was produced by the same method as in Example 1 except that in synthesizing the positive electrode active material, the tap density of the transition metal hydroxide was changed to a tap density of 1.0 g/cc. A positive electrode was formed by the same method as in Example 1 using the positive electrode active material, and the void ratio was measured. As a result, the void ratio of the positive electrode mixture layers was 40%. In addition, the void ratio of secondary particles of the positive electrode active material was 75% of the void ratio of the positive electrode mixture layers. The results of measurement of the pore size diameter distribution of the positive electrode mixture layers of the positive electrode formed described above show a distribution curve having two peaks.

A battery was produced by the same method as in Example 1 using the positive electrode formed as described above. This battery was referred to as "battery B3" of Comparative Example 3.

[Charge-Discharge Test]

Each of the batteries was charged at a constant current to 4.2 V at 0.1 C in an environment of 25° C., and then charged at a constant voltage until the current value corresponded to 0.01 C at 4.2 V, completing charging. After a 10-minute rest, discharge at a constant current was performed to 2.5 V at 1 C. The discharge capacity of each of the batteries was determined from the resultant discharge curve. Also, each of the batteries was charged under the charging conditions described above, and after a 10-minute rest, discharge at a constant current was performed to 2.5 V at 2 C. The discharge capacity of each of the batteries was determined from the resultant discharge curve.

TABLE 1

| | Positive electrode | | Battery | |
| --- | --- | --- | --- | --- |
| | Void ratio of positive electrode mixture layer (%) | Void ratio of secondary particle/void ratio of positive electrode mixture layer (%) | (discharge capacity [mAh]) | |
| | | | 1 C | 2 C |
| Example 1 | 22% | 55% | 2600 | 2250 |
| Example 2 | 19% | 35% | 2650 | 2210 |
| Example 3 | 28% | 69% | 2570 | 2230 |
| Example 4 | 22% | 31% | 2550 | 2000 |
| Comparative Example 1 | 22% | 28% | 2500 | 1750 |
| Comparative Example 2 | 35% | 45% | 2300 | 1725 |
| Comparative Example 3 | 40% | 75% | 2250 | 1800 |

Table 1 reveals that in the batteries A1 to A4 of Examples 1 to 4, the discharge capacities under the conditions of the discharge rates of 1 C and 2 C are significantly improved as compared with the batteries B1 to B3 of Comparative Examples 1 to 3, and thus an attempt can be made to increase the capacity and output. Among Examples 1 to 4, the batteries A1 to A3 of Examples 1 to 3 each using the positive electrode including the positive electrode mixture layers, which have a pore size diameter distribution having a single peak, show higher discharge capacity than the battery A4 of Example 4 using the positive electrode showing two peaks, and thus an attempt can be made to more increase the capacity and output.

INDUSTRIAL APPLICABILITY

The present invention can be used for a positive electrode for a nonaqueous electrolyte secondary battery and a nonaqueous electrolyte secondary battery.

REFERENCE SIGNS LIST

10 nonaqueous electrolyte secondary battery
11 outer case
12 sealing plate
13 positive electrode outer terminal
14 negative electrode outer terminal
15 gas release valve
16 liquid injection part
30 secondary particle
31 primary particle
32 void in secondary particle
33 long void
34 void between secondary particles

The invention claimed is:
1. A positive electrode for a nonaqueous electrolyte secondary battery, comprising a positive electrode current collector and a positive electrode mixture layer which contains a positive electrode active material and is disposed on the positive electrode current collector,
 wherein the void ratio of the positive electrode mixture layer is 30% or less, and the void ratio of secondary particles of the positive electrode active material is within a range of 30% or more and 70% or less of the void ratio of the positive electrode mixture layer, and the pore size diameter distribution of the positive electrode mixture layer is a distribution curve having a single peak, wherein the positive electrode active material includes one or more voids formed between primary particles in the secondary particles, the one or more voids including at least a long void communicating beyond a length corresponding to ⅙ of a particle diameter from a surface of each of the secondary particles, and wherein a ratio of the long voids to the one or more voids in the secondary particles is 50% or more.

2. The positive electrode for a nonaqueous electrolyte secondary battery according to claim 1, wherein the thickness of the positive electrode mixture layer is 100 μm or more.

3. A nonaqueous electrolyte secondary battery comprising a positive electrode, a negative electrode, and a nonaqueous electrolyte, wherein the positive electrode is the positive electrode for a nonaqueous electrolyte secondary battery according to claim 1.

* * * * *